Aug. 15, 1939.      W. J. GAZEY      2,169,896
METHOD OF PRODUCING WASTE-PIPE FITTINGS
Filed Sept. 26, 1938      2 Sheets-Sheet 1
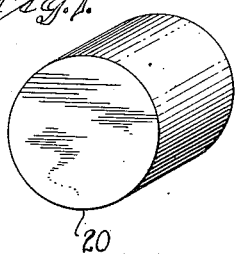
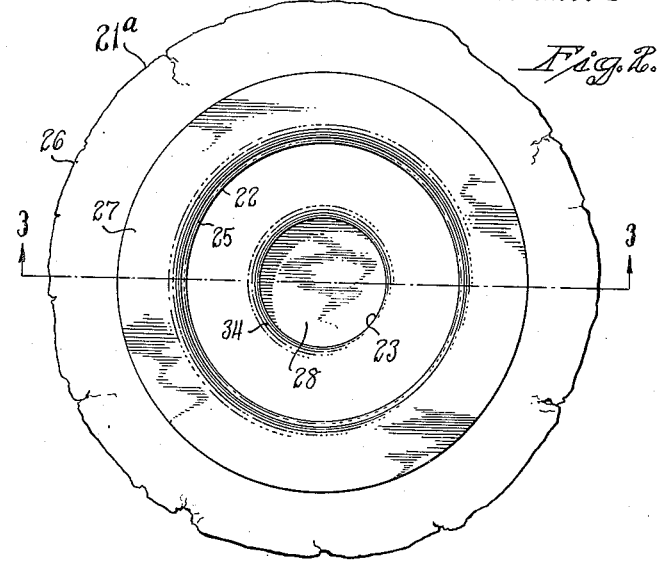
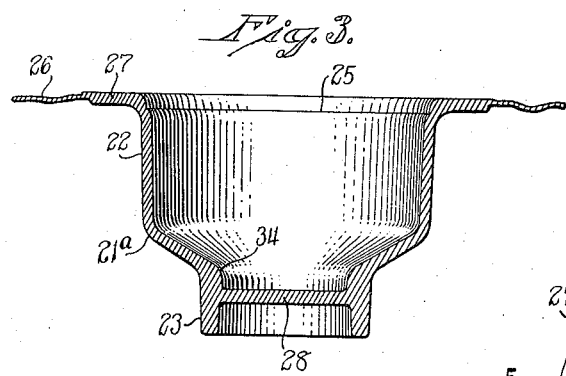
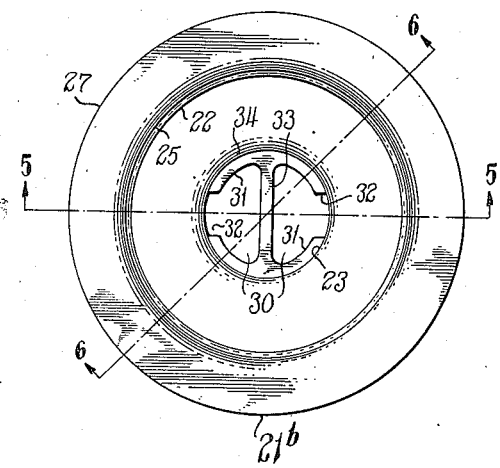
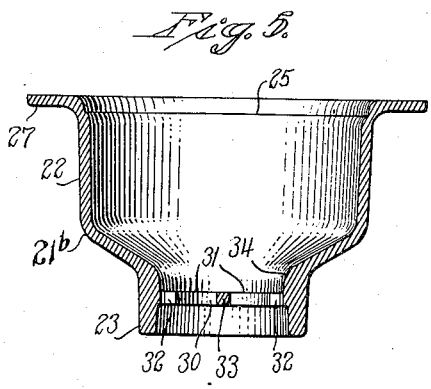
Inventor
William J. Gazey
by Seymour Earle Nichol
Attorneys Aug. 15, 1939.   W. J. GAZEY   2,169,896
METHOD OF PRODUCING WASTE-PIPE FITTINGS
Filed Sept. 26, 1938   2 Sheets-Sheet 2
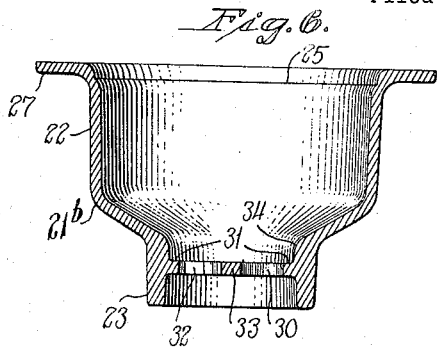
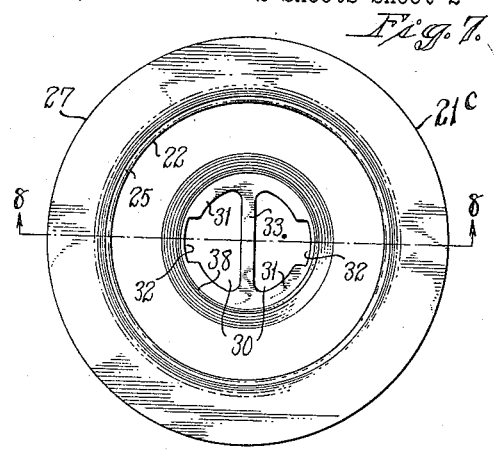
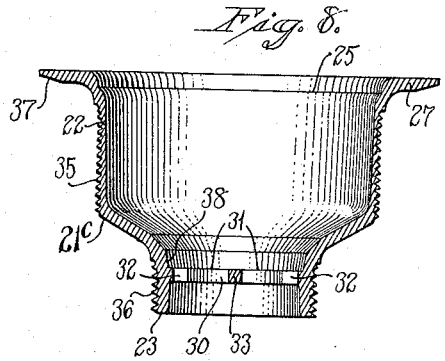
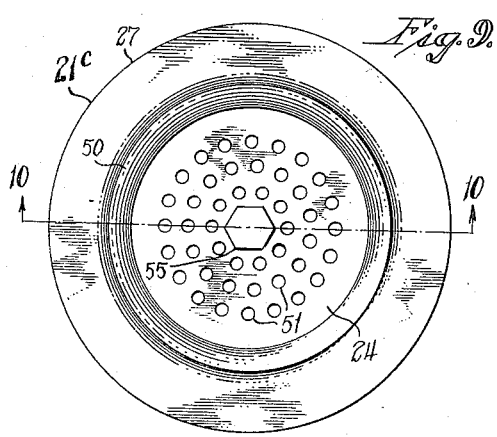
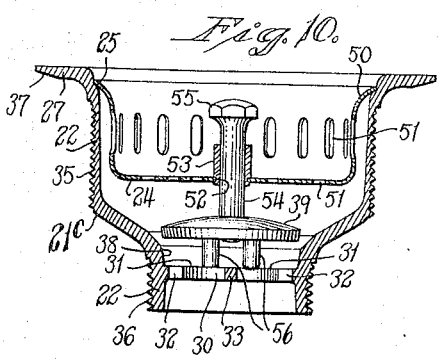
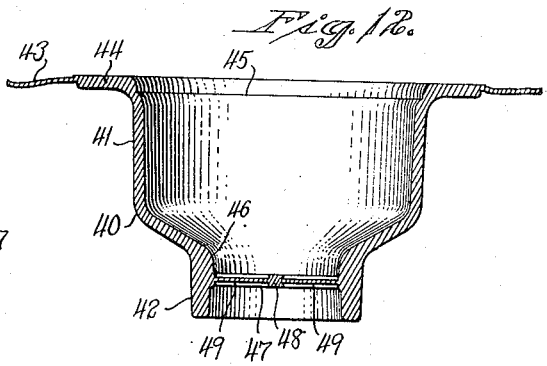
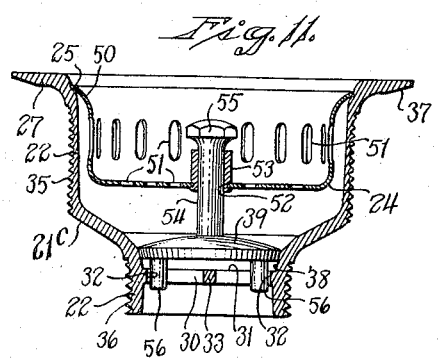
Inventor
By William J. Gazey
Seymour Earle Nichol
Attorneys Patented Aug. 15, 1939

2,169,896

UNITED STATES PATENT OFFICE 2,169,896

METHOD OF PRODUCING WASTE-PIPE FITTINGS

William J. Gazey, Waterbury, Conn., assignor to Chase Brass & Copper Co., Incorporated, Waterbury, Conn., a corporation Application September 26, 1938, Serial No. 231,659

5 Claims. (Cl. 29—157)

This invention relates to a superior method of manufacturing waste-pipe fittings for connection to waste-pipes or the like, and to the improved article produced thereby. More particularly, the present invention is concerned with the production of waste-pipe fittings of the type wherein a strainer-basket and a valve-plug are employed.

One of the objects of the present invention is to provide a superior method for producing waste-pipe fittings for connection to waste-pipes or the like, whereby the cost is materially reduced.

Another object of this invention is to provide a superior method whereby strong and homogeneous waste-pipe fittings may be produced with greater economy of materials.

A further object is to provide a superior method by means of which fittings of the character described may be produced with a minimum of time and effort.

Still a further object of the present invention is by means of the novel method which secures the described notable savings in production, to produce waste-pipe fittings which are characterized by marked superiority with respect to certain properties including low porosity, resistance to abrasion, etc.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a perspective view of a metal slug from which the waste-pipe fitting is to be formed;

Fig. 2 is a top plan view showing a blank in its first stage after the slug has been subjected to a forging operation;

Fig. 3 is a cross-sectional view of the first-stage blank, taken on the line 3—3 of Fig. 2;

Fig. 4 is a top plan view of the blank in its second-stage after a shearing operation has been performed thereon;

Fig. 5 is a transverse sectional view taken on the line 5—5 of Fig. 4;

Fig. 6 is another transverse sectional view taken on the line 6—6 of Fig. 4;

Fig. 7 is a top plan view of the blank in its third stage, in which the blank is in its final form;

Fig. 8 is a sectional view taken on the line 8—8 of Fig. 7;

Fig. 9 is a top-assembly view;

Fig. 10 is a sectional view taken on the line 10—10 of Fig. 9 and showing the valve-plug in its unseated position supported by its positioning-feet on the ledge-like projections in the throat-portion of the waste-pipe fitting;

Fig. 11 is a sectional view corresponding to Fig. 10, but showing the valve-plug in seated position with its positioning-feet located in the receiving-gaps between the ledge-like projections; and Fig. 12 is a sectional view showing an alternative form of first-stage blank.

It is a feature of the present invention that the new method to be described herein is one by which desirable and beneficial results developed by forging operations are utilized to full advantage to produce waste-pipe fittings of superior quality.

Accordingly, the waste-pipe fittings are composed of material which is suited to undergoing treatment. Preferably, the particular material employed is known as "forging brass" and contains about 60% copper, approximately 1½ lead and the balance zinc. The lead content of the composition enables the material to be advantageously worked.

The forging operation referred to is preferably carried out on a mass of "forging brass" termed a "slug" and indicated by the reference character 20 in Fig. 1. The forging operation is performed at some selected elevated temperature, it being estimated that temperatures ranging from 1350° F. to 1600° F. will permit forgings to be obtained which in all respects will result in waste-pipe fittings of the desired characteristics. Although not essential, it is also preferred that the heating take place in a reducing or non-oxidizing atmosphere.

The slug 20 is worked between suitable dies of a forging machine into a blank. This blank, for purposes of clarity of description, will be herein termed a "first-stage" blank and is designated generally by the reference character 21ª and shown in Figs. 2 and 3.

In the views just above referred to, it will be seen that by reason of the forging operation to which the slug 20 is subjected, the resultant first-stage blank 21ª is shaped to provide an upper cup-shaped body-portion 22 of relatively-large diameter and a lower throat-portion 23 of relatively-small diameter. The cup-shaped body-portion 22 is intended for the purpose of receiving a strainer-basket 24 (Figs. 9, 10 and 11) as will hereinafter appear, and is provided with an internal shoulder forming an annular basket-seat 25 on which an expanded edge-portion of the said strainer-basket 24 may rest. As is shown in the said Figs. 2 and 3, the said body-portion 22 is formed at its upper end with a radially-extending annular flange comprising an outer flash-portion 26 and an inner clamping-flange portion 27, the latter being provided for engaging the surface of a sink surrounding a drain-opening therein.

In accordance with the method of the present invention, the material composing the slug 20 is in the initial operation so forged as to be provide an integral transverse wall 28 in the lower throat-portion 23 of the first-stage blank 21ª, as is particularly well shown in Fig. 3. The forging operation is carried only to such point that the said transverse wall 28 remains of such thickness as to provide a cushion of metal between the dies of the forging machine.

Subsequently to being forged, the first-stage blank 21ª is subjected to what is here called for convenient reference a shearing operation, and emerges therefrom as a second-stage blank 21ᵇ, shown in Figs. 4 to 6 inclusive. In the shearing operation, the previously-described outer flash-portion 26 is trimmed off, leaving the upper clamping-flange 27. Also, as is clearly shown in the views referred to, portions of the transverse wall 28 in the throat-portion 23 of the blank are sheared away or otherwise removed. By this latter operation, there is provided in the said throat-portion 23 a drainage-passage 30 and the portions of the said transverse wall 28 remaining after the shearing operation provide a cross-web comprising supporting-ledges 31—31 spaced apart by receiving-gaps 32—32 and a cross-bar 33 which extends diametrically across the said drainage-passage 30, centrally connecting the spaced supporting-ledges 31—31.

In the preferred arrangement, which is the form shown herein, the initial working of the slug 20, i. e., the forging operation, is of such character that the transverse wall 28 is formed intermediate the extremities of the throat-portion 23 of the blank. Consequently, the supporting-ledges 31—31 and the connecting cross-bar 33 formed as a result of the shearing operation, as just above described, are positioned in the said throat-portion 23 below an upper seat-forming portion 34 thereof and are so located above the lower end of the said throat-portion that a substantial portion thereof is available for connection to a waste-pipe or the like. In this arrangement, the said supporting-ledges 31—31 and the connecting cross-bar 33 are thus located above the lower end of the throat-portion 23 and effectively guarded against damage.

As a result of the described forging operation, the first-stage blank 21ª acquires smooth homogeneous wall-surfaces. This desirable feature is used to advantage, for after the described subsequent shearing operation in which the blank is developed to provide the second-stage blank 21ᵇ referred to and shown in Figs. 4 to 6 inclusive, the blank is in such condition that the major portion of its wall-surfaces require no further grinding or machining.

Subsequently to the shearing operations above described, which result in the production of the second-stage blank 21ᵇ, the latter is subjected to further operations which result in the formation of what for convenience of description will be referred to as a "third-stage" blank 21ᶜ which is illustrated in Figs. 7 to 11 inclusive.

To produce the third-stage blank 21ᶜ from the second-stage blank 21ᵇ, the latter is, as is illustrated in Figs. 7 to 11 inclusive, subjected to a threading operation to provide external threads 35 on the body-portion 22, for the reception of a suitable clamping-nut or the like in the usual manner of waste-pipe fittings. The exterior of the throat-portion 23 is also provided with external threads 36 adapted to be threaded into a drain-pipe coupling or the like. The under-edge of the flange 27 of the third-stage blank is preferably beveled as at 37 for more accurate fitting with the sloping portion of a sink, bathtub, or the like, around the usual drain-opening therein.

With respect to its interior surfaces, the third-stage blank 21ᶜ is substantially the same as the similar surfaces of the second-stage blank 21ᵇ, save that the seat-forming portion 34 of the said second-stage blank is turned down to provide a smooth-surfaced conical valve-seat 38 designed for engagement by a valve-plug 39 associated with the previously-mentioned strainer-basket 24, as will more fully hereinafter appear.

The third-stage blank 21ᶜ, after the operations above described, is substantially in completed form and may be plated with suitable metals, in which latter operation the beneficial effects of the initial forging operation are available, inasmuch as it provides a smooth, hard and non-porous surface for the reception of such plating.

Before describing the assembly of the strainer-basket 24, valve-plug 39, and associated parts with the now-completed waste-pipe fitting 21ᶜ, brief reference may here be had to the modified form of first-stage blank illustrated in Fig. 12.

Like the first-stage blank 21ª before described, the slightly-modified form of first-stage blank 40 shown in Fig. 12, includes an upper cup-shaped body-portion 41, a lower throat-portion 42 of smaller diameter than the said body-portion, and a radially-extending flange-like terminal-portion at the upper end of the said body-portion 41. The terminal-portion just referred to includes an outer flash-portion 43 and an inner clamping-flange 44 corresponding, when the said flash-portion 43 is trimmed off, to the finished clamping-flange 27 of the previously-described fitting.

Like the blanks of the preceding figures, the first-stage blank 40 of Fig. 12 is formed interiorly adjacent its upper end with a basket-seat 45 and with an interior seat-forming portion 46 adjacent the junction of its body-portion 41 with its throat-portion 42. Intermediate the upper and lower ends of its throat-portion 42, the first-stage blank 40 is formed with a transverse wall 47 corresponding in all major respects to the transverse wall 28 before described, save that it is provided with a relatively-thick center-portion 48 which is adapted to constitute, when the blank is sheared, a cross-bar corresponding to the cross-bar 33 of the preceding figures. On each of the respective opposite sides of the center-portion 48, the transverse wall 47 is forged down to produce relatively-thin diaphragm-like portions 49—49 which may be subsequently sheared or otherwise removed to produce passages through which waste water and the like may downwardly flow.

In summary, it may be stated that the first-stage blank 40 of Fig. 12 corresponds in all essentials to the first-stage blank 21ª of Figs. 2 and 3, with the exception that certain portions of the transverse wall 47 in the throat-portion 42 are thinned so as to require but a relatively-light shearing action to provide a drain-passage through the said throat-portion 42.

Returning now to the assembly illustrated in Figs. 9 to 11 inclusive, it will be noted that the strainer-basket 24 is of cup-shaped form and has at its upper end an outwardly-projecting annular flange 50 which at its outer edge is adapted to engage with the basket-seat 25 for the purpose of supporting the said strainer-basket 24 within the upper portion of the body-portion 22. The usual drainage perforations 51 are provided in both the bottom and side walls of the said strainer-basket 24 in addition to a central opening 52 in the bottom wall in which is mounted a guide-tube 53 secured in place by riveting, soldering, or the like.

Mounted with freedom for both rotation and reciprocation in the guide-tube 53, just above referred to, is a valve-stem 54 extending upwardly from the valve-plug 39, before referred to, and having a polygonal head 55 at its upper end located in position for being conveniently grasped by the fingers for effecting the lifting and turning movements of the valve-plug 39 for the purpose as will presently appear.

Projecting downwardly from the under-side of the valve-plug 39, adjacent its periphery and at diametrically-opposite points, are two positioning-lugs 56—56 which under one set of conditions are adapted to fit within the gaps 32 in the transverse wall 28 and under another set of conditions are adapted to rest upon the upper faces of the supporting-ledges 31—31.

When it is desired to permit waste water to drain outwardly through the fitting, the valve-plug 39 is lifted by means of the head 55 of the valve-stem 54, and rotated sufficiently to cause the positioning-lugs 56 to rest upon the supporting-ledges 31—31, as is shown in Fig. 10. When, however, it is desired to prevent the egress of water through the waste-fitting, the valve-plug 39 may be rotated by means of the head 55 of its valve-stem 54 until the positioning-lugs 56—56 come into registry with the gaps 32—32, whereupon the said valve-plug will be free to drop by gravity and seat against the valve-seat 38 at the juncture of the throat-portion 23 and the body-portion 22, as is shown in Fig. 11.

By reference to Figs. 10 and 11, it will also be observed that the body of the strainer-basket 24 is at all times spaced sufficiently above the throat-portion 23 of the waste-pipe fitting to allow free movement of the valve-plug 39 to open and closed positions, as desired.

In producing waste-pipe fittings in accordance with the present invention, it has been found possible to avoid disadvantages associated with certain other methods of manufacture, which methods possibly tend to develop properties undesirable in articles of the type here under consideration, and from which defects in the said articles are likely to occur. Taking casting as a typical example of a different method of manufacture, there is present in the casting method no such facility as is found in the present method with respect to obtaining waste-pipe fittings formed with portions of the desired and of relative thickness. It is obvious, too, that a far greater degree of grinding or finishing is required when the casting method is employed. Also, holes, flaws and other defects are known to occur with disturbing frequency in castings. The presence of holes or other flaws in waste-pipe fittings impair the strength of the articles and result in undesirable high porosity, whereby the articles are poorly suited to the purpose for which they are intended.

In proceeding by the method herein disclosed, undesirable conditions such as those of the nature pointed out above are effectively remedied.

It will be appreciated that in the described method of the present invention, upon completion of the first operation to which the slug 20 is subjected, the blank is forged into substantially the shape and the dimensions of the finished waste-pipe fittings. This enables important production economies to be effected with respect to materials, operations and time. During the said initial forging operation by which the first-stage blank 21a is formed, the smooth homogenity acquired by the wall-surfaces is of such nature that much of the grinding and machining that would ordinarily be required, as, for example, in the case of a casting, may be dispensed with, thereby adding considerably to desirable production savings. Then, as has been pointed out, from the initial forging-operation the first-stage blank 21a emerges in such condition that after its development to the third-stage blank 21c, as described, no supplemental operations are necessary to prepare the blank to receive a plating-finish.

From the foregoing it will be clear that the method here explained is one by which waste-pipe fittings comprising an upper flanged-portion, a lower throat-portion and ledge-like projections in the throat-portion, all integrally formed, are produced in such manner that waste of materials does not occur and substantial other savings with respect to manufacturing steps and costs are advantageously secured.

The improved method which results in the savings referred to with respect to materials and manufacturing operations also results in the poduction of waste-pipe fittings of superior quality. The close compacting of the metal and other features obtained in proceeding in accordance with the method of the present invention make available in the waste-pipe fittings thereby produced certain characteristics, including adequate strength, resistance to abrasion, and extremely low porosity, all of which are highly desirable in articles of the class to which the present invention relates.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A method of producing waste-fittings for connection to waste-pipes or the like, comprising: subjecting a mass of metal to a forging operation to provide an upper portion of relatively-large diameter, a lower throat-portion of relatively-small diameter, and a transverse wall extending across the interior of the said throat-portion; and then removing a portion of the said transverse wall in the said throat-portion to provide a drainage-passage therethrough and ledge-like projections therein spaced apart by receiving-gaps for respectively supporting and receiving positioning-means of a valve-plug for the said drainage-passage.

2. A method of producing waste-fittings for connection to waste-pipes or the like, comprising: subjecting a mass of metal to a forging operation to provide an upper portion of relatively-large diameter, a lower throat-portion of relatively-small diameter, and a transverse wall extending across the interior of the said throat-portion; and then removing a portion of the said transverse wall in the said throat-portion to provide a drainage-passage therethrough, ledge-like projections therein spaced apart by receiving-gaps, and a strengthening-bar extending across the said throat-portion and connecting the spaced ledge-like projections therein.

3. A method of producing waste-fittings for connection to waste-pipes or the like, comprising: subjecting a mass of metal to a forging operation to provide an upper flanged portion of relatively-large diameter, a lower throat-portion of relatively-small diameter, and a transverse wall extending across the interior of the said throat-portion; and then shearing away a portion of the flange of the upper flanged portion and also shearing away a portion of the said transverse wall in the said throat-portion to provide a drainage-passage therethrough and ledge-like projections spaced apart by receiving-gaps for respectively supporting and receiving positioning-means of a valve-plug for the said drainage-passage.

4. A method of producing waste-fittings for connection to waste-pipes or the like, comprising: subjecting a mass of metal to a forging operation to provide an upper flanged portion of relatively-large diameter, a lower throat-portion of relatively-small diameter, and a transverse wall extending across the interior of the said throat-portion; and then shearing away a portion of the flange of the upper flanged portion and also shearing away a portion of the said transverse wall in the said throat-portion to provide a drainage-passage therethrough, ledge-like projections spaced apart by receiving-gaps, and a strengthening-bar extending across the said throat-portion and connecting the spaced ledge-like projections therein.

5. A method of producing waste-fittings for connection to waste-pipes or the like, comprising: subjecting a mass of metal to a forging operation to provide an upper portion of relatively-large diameter, a lower throat-portion of relatively-small diameter, and a transverse wall formed with relatively-thick and relatively-thin portions extending across the interior of said throat-portion; and then removing the relatively-thin portion of the said transverse wall in the said throat-portion to provide a drainage-passage therethrough and a legde-like projection therein formed of the relatively-thick portion of the said transverse wall.

WILLIAM J. GAZEY.